Aug. 8, 1944.  F. L. WHITE  2,355,252
CONTROL SYSTEM FOR EXCAVATORS
Filed July 29, 1943

Inventor
FRED L. WHITE
By Alfred F. Rees
Attorney

Patented Aug. 8, 1944

2,355,252

UNITED STATES PATENT OFFICE 2,355,252

CONTROL SYSTEM FOR EXCAVATORS

Fred L. White, Marion, Ohio, assignor to The Osgood Company, Marion, Ohio, a corporation of Ohio Application July 29, 1943, Serial No. 496,669

7 Claims. (Cl. 212—69)

This invention relates to portable hoists or excavators and in its more specific aspects is directed to clutch controlling systems for the travel and swing clutches of such devices.

The object of the invention is to provide the travel and swing clutches of a portable hoist or excavator with pressure fluid operating mechanism commonly controlled in order that they may be operated in an unvarying time sequence.

A further object of the invention is the provision of travel and swing clutch actuators for a portable hoist or excavator that is not only intended to cause them to selectively engage but to keep them engaged regardless of the character or extent of load applied to each individual clutch device.

A still further object of the invention is to secure more instantaneous response of the travel and swing clutches of a portable hoist or excavator to the will of the operator.

Another and further object of the invention is to provide a clutch actuating system for the travel and swing clutches of a portable hoist or excavator that will enable the construction of a more simplified clutch and still retain its engagement under varying load conditions.

Other and still further objects of the invention are to reduce the physical effort normally required in shifting the swing and travel clutches of a portable hoist or excavator, to provide against possible disengagement of the clutches while under load, to simplify the control mechanism therefor and to eliminate the operating hazards normally associated with the manual lever mechanisms of the prior art structures.

Other and further objects will occur to those skilled in the arts to which this invention pertains as the description proceeds which taken in connection with the accompanying drawing sets forth a preferred embodiment and selected modifications of the invention but such disclosures are not to be construed as a limitation of the invention which is limited only by the appended claims and any and all modifications, alterations and variations of structure coming within the spirit and scope hereof are deemed to be included herein.

Figure 1:
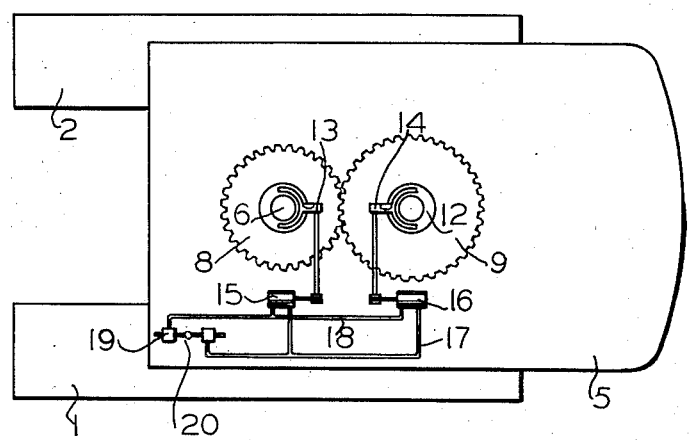
Fig. 1 is a plan view of the clutch control system as applied to a hoist or excavator.

The prior construction employed in the swing and travel clutches for portable excavators and similar structures were of the manual type in which each clutch was individually controlled. In view of the rather great quantities of power transmitted the reliability of clutch engagement was a decidedly uncertain factor. Frequently the clutch would disengage under load with its consequent damage to the mechanism and necessity of reinitiating a swing or travel movement. Various expedients have been employed to prevent clutch disengagement such as forcibly retaining the engagement by tying the clutch lever or otherwise retaining the clutch in engagement. Inverted or undercut clutch teeth jaws have been attempted but these too have not always proved satisfactory for the reason that they are difficult to disengage quickly. Combination of locking and tying mechanism have likewise been employed but these too have not proved satisfactory.

The instant invention seeks to overcome the defects of former construction and make possible the use of more easily engageable clutches. The very character of load transmitted has dictated the form of clutch and the instant invention also seeks to simplify that element of the combination. The pressure fluid system employed achieves a two fold purpose; it provides for the shifting of the clutch elements and it locks the clutches in engagement. Numerous subsidiary achievements are obtained most important of which is that it relieves the operator of the necessity of determining just when the clutch jaws go into engagement; the mechanism determining this for him. Furthermore it is not necessary to employ inverted or undercut jaws but they can in fact be tapered or cut oppositely thereby enabling them to slide easily into engagement. The pressure fluid system moreover, provides a rigid lock and keeps the clutches engaged even with trapezoidal formed jaw and jaw openings, with the opening diverging outwardly and the clutch jaw tooth complementing the jaw tooth opening form.

The above objects and advantages are embodied in the structure disclosed in the accompanying drawing in which 1 and 2 schematically represent treads on which a supporting element 3 is mounted for movement over the ground. Element 4 is a gear fixed to the supporting element 3 in the conventional manner. A deck element or upper body 5 is rotatably supported on the element 3 by mechanism well known to the art. The term "deck" as employed in this case is intended to have a meaning coextensive with the meaning of the term "upper body."

Coaxially arranged with the gear element 4 is travel clutch and transmission 6, of which only jaw clutch 7 is shown complete. The clutch is adapted to engage with a complemental jaw tooth element formed in the gear 8 coaxially arranged with gear 4 and jaw clutch element 7.

Gear 9 meshes directly with gear 8 or may have an idler (not shown) placed between the gears and its axis of rotation is so arranged that it is coaxial with that of gear 11 and adapted to engage or mesh with gear 4. Gears 9 and 11 are connected by a shaft 10 journaled in the deck 5. Jaw clutch 12 is coaxially disposed with respect to the shaft 10 and is further adapted to engage with a complemental formation (not shown) in the gear 9. The clutch 12 in the instant illustration is shown as in the engaged position. The gear 8 is intended to swing or rotate the deck 5 on the supporting element 3 and to drive gear 8 which in turn is intended to travel the treads 1 and 2. Gear 9 receives power from a suitable prime mover mounted on deck 5 in the well known manner through appropriate transmission gearing.

Figure 2:
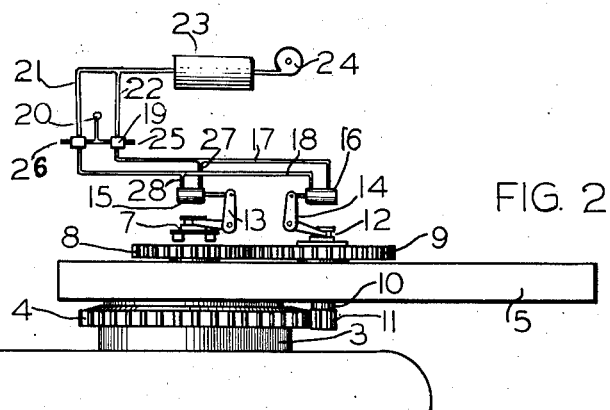
Fig. 2 is an elevational view of the control system applied to the hoist or excavator.

It was pointed out above that these clutches are normally difficult to control manually in the prior art construction with ease of manipulation. There is therefore set forth in this disclosure a means for not only causing the jaw clutch elements 7 and 12 to engage and disengage easily but also to keep them in engagement without the necessity of providing auxiliary locking means. To this end adjacent each of the clutches is arranged a pivoted bracket element appropriately pivoted by means (not shown) to the upper body or deck 5. One arm of the brackets 13 and 14 engages the collared end of the clutches 7 and 12 to enable them to rotate relatively thereto. The other end of the brackets 13 and 14 are pivotally connected to the plungers of double acting pressure fluid motors 15 and 16 associated respectively with the said motors as shown in Fig. 2.

Each of the motors 15 and 16 has connected thereto conduits 17 and 18 each of which leads to a double reversing valve arrangement 19 actuable by a control handle 20. Conduits 21 and 22 constitute supply conduits that join at the pressure fluid storage and supply tanks 23 which derive pressure fluid from pump 24. The instant illustration shows compressed air as the pressure fluid that is exhausted to the atmosphere at the valves. In the event some other fluid or liquid is employed a convenient sump (not shown) would have to be supplied which would receive supply fluid used in the system. Stub conduits 25 and 26 constitute the exhaust ducts in the instant illustration. Conduits 27 and 28 are connected to conduits 17 and 18 and transmit pressure fluid to and from the motor 15.

Attention is at this point invited to the fact that conduit 17 is connected to one end of the motor 16 and the conduit 27 is connected to conduit 17 and is further connected to the opposite end of motor 15. Conduits 18 and 28 are likewise oppositely connected to the motors 15 and 16 in the same manner. This particular connection provides for disengaging one clutch while the other engages. This eliminates the possibility of both clutches being simultaneously in engagement. There are and may be occasions when the load limit of the prime mover might be easily exceeded if both swing and travel transmission were under heavy load. To obviate this possibility the motors have been connected so as to provide for the engagement of only one clutch at a time. The clutches are kept in engagement by having the pressure retained on the selected motor. Owing to the linkage and bracket connecting motor and clutch there is no possibility of either clutch opening under load.

Figure 3:
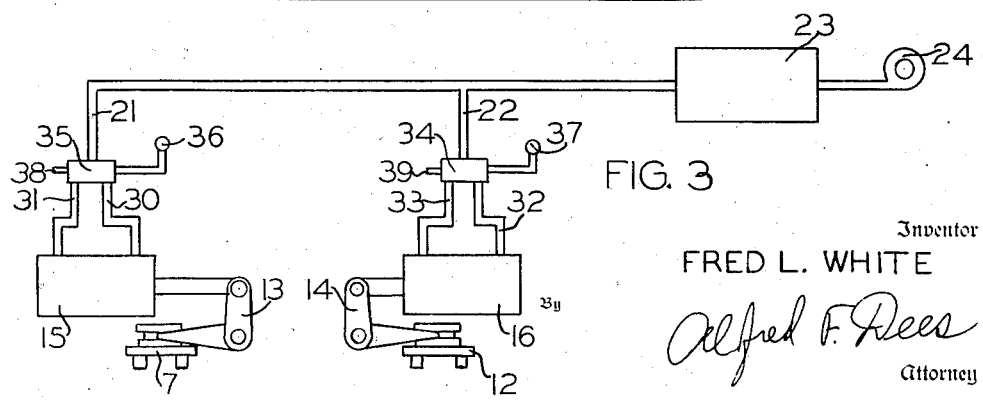
Fig. 3 is circuit diagram of a modified clutch control system.

A modified structure is shown in Fig. 3 in which there are separate valves for each of the respective motors. All parts in Fig. 3 similar to those of Figs. 1 and 2 bear the same numerals. There is a separate conduit system 30, 31, 32 and 33 leading to each of the motor devices 15 and 16 from each of the reversing valves 34 and 35. These valves have separate controllers 36 and 37 respectively and have exhaust ports 38 and 39. Supply conduit for the motors is similar to that in Figs. 1 and 2. This organization assures the operator of a more flexible control enabling him to both traverse and rotate the deck at his election. The same action of pressure fluid on the motors to lock the clutches in shifted position is performed and if desired the same alternate sequence of operations as described above is performable, but subject to the absolute control of the operator.

It is therefore apparent in the operation of pressure fluid clutches of the instant disclosure that the operator is relieved of the necessity of wondering whether the jaws of the clutch will properly mate with the jaws in the respective gears 8 and 9. In the hand lever operation the operator is obliged to feel his way, frequently causing damage when the jaws disengage because of lack of pressure. With the pressure fluid devices described above, the same force is always applied and at the instant the jaws of clutch and gear are properly positioned or aligned they will inter-engage without the necessity of trial and error. This reduces the hazard of breakage to both parts. Once engaged, pressure is maintained on the pressure fluid motors and it will effectively lock each clutch in its shifted or adjusted position.

That which is regarded new, novel and useful and which is sought to be protected by Letters Patent of the United States is as follows.

1. In a clutch control for an excavator; a movable element adapted to traverse a surface; a deck element rotatably associated with said movable element; a transmission element to traverse said movable element; a transmission to rotate said deck; a shiftable clutch for said traversing transmission; a shiftable clutch for said deck rotating transmission; a pressure fluid motor mounted on said deck associated with each clutch to open and close same; a source of pressure fluid; a reversing valve supported on said deck to govern the admission of pressure fluid to said motors; conduits connecting said valve and said motors; and said conduits connecting said valve and motors arranged such that one of said clutches will be engaged while the other of said clutches is disengaged.

2. In a control for a hoist; a frame supportable on ground traversing means; a deck rotatably supported on the upper body; a transmission including a clutch to traverse said frame; a transmission including a clutch to rotate said deck; a pressure fluid operated means mounted on said deck operatively associated with each clutch to open and close said clutches; a reversing valve unit supported on said deck; conduits connecting said pressure fluid means and said reversing valve unit; a source of pressure fluid connected to said valve; said conduits connecting said valve unit and said pressure fluid operated means arranged such that one clutch will be held in an open position and the other clutch in a closed position; and said pressure fluid when kept applied to said pressure fluid operated means locking said clutches in their shifted positions.

3. In a portable material handling unit; a frame traversable over the ground; a deck element rotatably mounted on said frame; a pair of meshed gears supported on said deck, one gear concentric with the axis of rotation of said deck and forming one end of a transmission unit to traverse said frame, the other gear forming the end of a transmission unit to rotate said deck; a clutch element associated with each gear; motor means mounted on said deck operatively associated with each gear to bring each of said clutches into engagement with its respective gear; a controller for said motor means supported on said deck; means connecting said controller means and said motor means; a source of power supply for said motor means; said connecting means being so constructed and arranged that one of said clutches is engaged while the other is disengaged; and said motor means locking said clutches in their respective shifted position as long as power is applied to said motor means.

4. In a portable material handling device; a frame supported for traverse over the ground; a deck rotatably mounted on said frame; a transmission element terminating in a gear, said gear concentric with the axis of rotation of said deck and disposed parallel to the plane of said deck to traverse said frame; a transmission element terminating in a gear to rotate said deck, said gear operatively associated with said first mentioned gear; a clutch associated with each gear and adapted for selective engagement therewith; a pressure fluid motor mounted on said deck to actuate each clutch; a reversing valve mechanism supported on said deck; a source of pressure fluid supply connectible with said valve mechanism; and conduits connecting said motors and said valve; said conduits arranged such that one of said clutches is engaged while the other is disengaged; the pressure fluid keeping said clutches locked in shifted position as long as pressure is applied threeto.

5. In a clutch control for a traversible material handling device; a frame element; an element rotatably supported on said frame; a transmission unit adapted to traverse said frame connectable to a gear element concentrically disposed about the axis of rotation of said element; a transmission unit associated with said deck for rotating said deck about its axis of rotation and connectable to a gear operatively associated with said first mentioned gear; a clutch to engage each gear with its respective transmission; a pressure fluid motor device mounted on said deck to bring each of said clutches into selective engagement with its respective gear; means to control the admission of pressure fluid to said motor devices supported on said deck; and a source of pressure fluid for said pressure fluid motors; said pressure fluid keeping said clutches locked in selected adjustment when applied to said motors.

6. In a material handling device; a frame traversible over the ground; a deck element rotatably mounted on said frame; a transmission element terminating in a clutch for traversing said frame; a transmission element associated with said deck for rotating same; a gear element concentric with the axis of rotation of said deck and adapted for engagement with the traversing tranmission element; a gear element concentric with said deck rotating transmission and engageable with said first mentioned gear; a pressure fluid motor mounted on said deck associated with each clutch to actuate same; a source of pressure fluid supply to actuate each of said motors; and means to control the selected admission of pressure fluid to said motors to selectively shift said clutches supported on said deck; said clutches locked in shifted position by keeping pressure fluid applied to the actuating motors.

7. In a device as defined in claim 6 in which said means to control the selective admission of pressure fluid to said motors comprises; reversing valve elements; conduits connecting said valve elements and said motors; and said conduits constructed and arranged to selectively apply pressure fluid to one or the other of said motors.

FRED L. WHITE.